May 19, 1970    C. G. RINKER    3,512,898
PROTABLE POWER-DRIVEN BLOWER
Filed Aug. 19, 1968

INVENTOR.
Carl G. Rinker
BY
Frease & Bishop
ATTORNEYS

United States Patent Office 3,512,898
Patented May 19, 1970

3,512,898
PORTABLE POWER-DRIVEN BLOWER
Carl G. Rinker, near Atwater, Ohio, assignor to The Atwater-Strong Company, Inc., Atwater, Ohio, a corporation of Ohio
Filed Aug. 19, 1968, Ser. No. 753,595
Int. Cl. F04c 29/00; F04d 25/00
U.S. Cl. 415—94                                         3 Claims

ABSTRACT OF THE DISCLOSURE

A portable power-driven blower for cleaning walks, pavements, parking areas, lawns, golf courses, roofs, etc., having a fan housing with an inlet eye and two oppositely disposed outlet necks.

A power-driven rotary fan is located in the housing and rotated in one direction only. A damper is pivotally mounted within the housing and adapted to be selectively operated to positions alternately cutting off communication of either outlet neck with the fan housing and directing the air blast from the fan through the other outlet neck.

BACKGROUND OF THE INVENTION

Field of the invention

The invention relates to portable blowers of the type having a power-driven fan creating a tremendous air blast for quickly and thoroughly cleaning almost any surface or area of loose litter of all descriptions.

The portable blower comprises a circular fan housing having a power-driven fan therein rotatable in one direction only. A central eye or eyes provides air inlet means for the fan, and a pair of oppositely disposed tangential outlet necks provide means for alternately discharging the air blast from the fan in opposite directions.

A damper is pivotally mounted within the housing and adapted to be operated to selectively cut off communication of either outlet neck with the fan and direct the entire air blast from the fan through the other outlet neck.

Description of the prior art

To the best of applicant's knowledge, portable blowers of the prior art fall into two general classes. Either there is only one outlet neck at one side only of the fan housing, or if there are oppositely disposed outlet necks, it is necessary to reverse the direction of rotation of the fan in order to change the direction of the air blast from one outlet neck to the other.

Where there is only one outlet neck at one side of the fan housing, it is necessary that the blower be turned around and moved in the opposite direction in order to change the direction of the air blast. This is particularly undesirable where the blower may be mounted upon a tractor.

In the cases where it is necessary to reverse the direction of rotation of the fan, reversing gears are required and this is a very undesirable feature as it causes friction and thus reduces the power of the air blast.

SUMMARY OF THE INVENTION

In general terms, the invention may be briefly described as a portable blower comprising a circular fan housing with a fan mounted therein and adapted to be rotated in one direction only. A central eye or eyes, in one or opposite ends of the fan housing, provide for the inlet of air to the fan, and a pair of oppositely disposed tangential outlet necks are provided for discharging the air blast from the fan in either direction.

A damper is pivotally mounted within the housing and means is provided for selectively operating the damper to positions alternately cutting off communication of either of the outlet necks with the fan housing and directing the air blast from the fan through the other outlet neck, while the fan is rotated in the same direction.

A primary object of the invention is to provide a power-driven blower having oppositely disposed tangential outlet necks, a fan within the housing rotating in one direction only and means for selectively directing the air blast from the fan through either of the outlet necks.

A further object of the invention is to provide such a blower in which a pivotally mounted damper is operated to direct the air blast from the fan through either outlet neck while simultaneously cutting off communication with the other outlet neck.

These and other objects, apparent from the drawings and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principle, being set forth in detail in the following description and illustrated in the accompanying drawings.

DESCRIPTION OF THE PREFERRED EMBODIMENT

Figure 1:
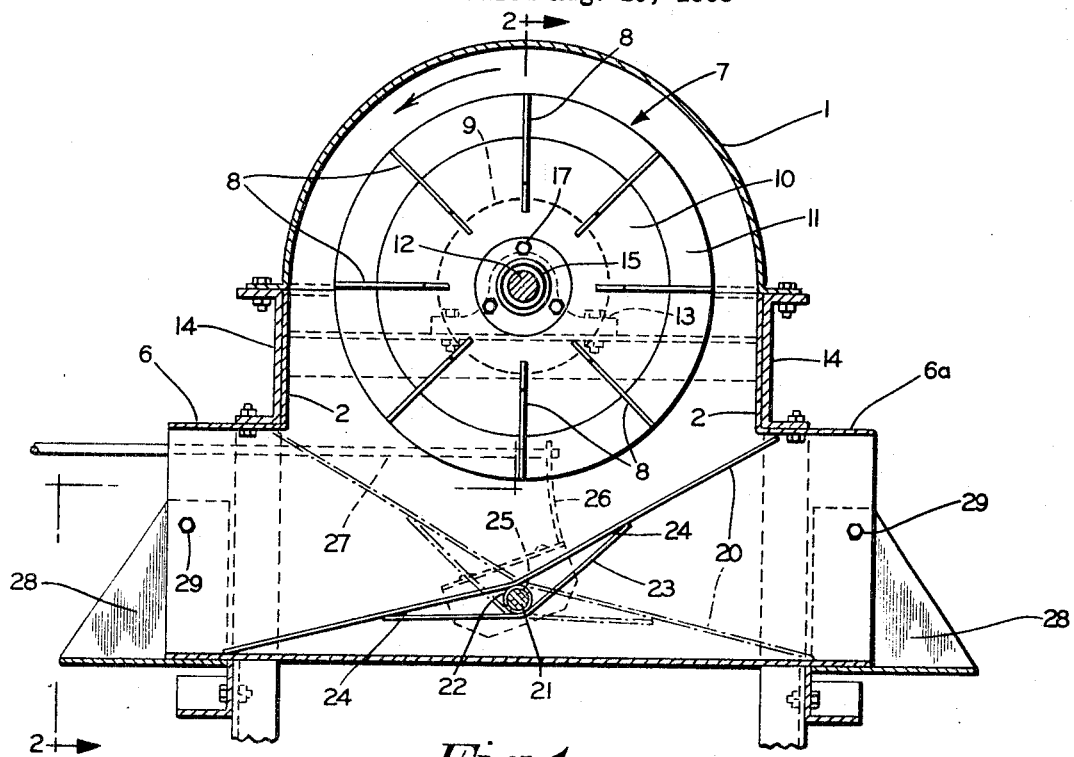
FIG. 1 is a transverse sectional view through the fan housing of a portable blower embodying the invention.

The invention is applicable to portable blowers which may be mounted upon wheels and manipulated by a handle of the general type of a lawn mower, or which may be mounted in groups of two or more upon a frame attached to a tractor.

In either case, the construction to which the invention pertains is the same and comprises generally a rounded housing within which is located a fan rotatable in one direction only by power means, a pair of oppositely disposed tangential outlet necks and a pivoted damper adapted to be selectively moved to positions to cut off either outlet neck and direct the air blast from the fan through the other.

In either case the fan is power driven in one direction only. Where the blower is mounted upon wheels and manipulated by a handle like a lawn mower, the fan may be driven by an internal combustion engine in much the same manner as a blade or cutting reel of a lawn mower.

In cases where the blower is mounted upon a frame carried by the tractor, the fan may be driven by suitable connection to the power outlet of the tractor.

For the purpose of illustration, the invention is shown as applied to a blower mounted upon a frame carried by a tractor. Although two or more blower units are usually mounted upon the same frame, only one unit is illustrated in the drawings.

Figure 2:
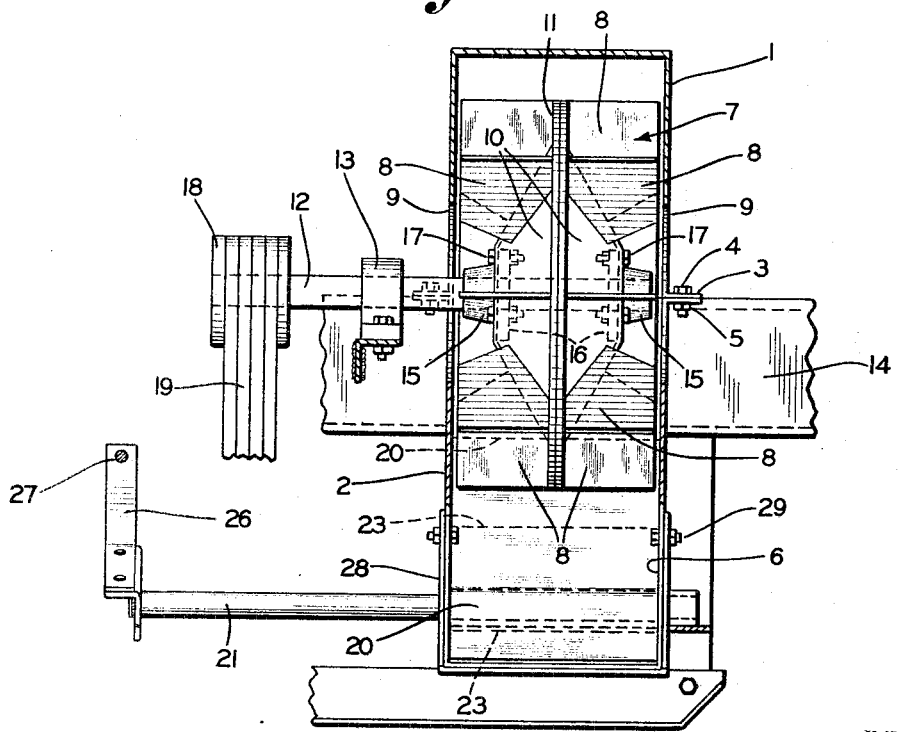
FIG. 2 is a section taken substantially on the line 2—2, FIG. 1.

The housing is shown as formed of the upper half round portion 1 and the lower portion 2. Mating flanges 3 are formed at the meeting edges of the upper and lower sections of the housing and may be connected together by bolts 4 and nuts 5, as best shown in FIG. 2. At the bottom of the lower section 2 of the housing is located a pair of oppositely disposed tangential outlet necks 6 and 6a.

A rotary fan indicated generally at 7 is located in the housing. Although this fan may be of conventional type with blades upon one side only and a single inlet eye in the housing, the type of fan shown in the drawing has radial blades 8 on opposite sides and the fan housing is provided with inlet eyes 9 on opposite sides.

The fan as shown is formed of two similar sheet metal shells 10 having mating peripheral flanges 11. The fan is fixed upon the fan shaft 12 journalled in suitable bearings as indicated at 13 mounted upon the supporting frame, a portion of which is indicated at 14.

The shells 10 of the fan are fixed to the shaft 12 by journal members having conical portions 15 keyed to the shaft in conventional manner and flanges 16 attached to the shells 10 by bolts 17. A pulley or the like 18 upon the fan shaft 12 may be connected by belt or the like 19 to the power takeoff of the tractor or to the drive shaft of the engine, depending upon the manner in which the blower is mounted for use.

A damper 20 is provided for cutting off communication between either outlet neck 6 or 6a and the fan so that the entire blast of air from the fan will be discharged through the other outlet neck. As best shown in FIG. 1, this damper is fixed to the oscillating adjusting shaft 21. For this purpose, a tube 22 may be fixed to the underside of the damper 20 at its center as by a sheet metal strap or straps 23, the ends of which may be welded or otherwise attached to the underside of the damper as at 24.

A pin 25 may be provided for fixing the tube 22 upon the shaft 21. A spring lever 26 may be fixed upon the adjusting shaft 21, and a link 27 connected thereto for rocking the shaft so as to move the damper 20 from the full line position shutting off the outlet neck 6a so that the air blast will be directed through the outlet neck 6, to the broken line position shutting off the outlet neck 6 and directing the air blast through the neck 6a. During operation of the blower, the fan is continually rotated only in one direction, as indicated by the arrow in FIG. 1.

In order to prevent the air blast from being directed downward onto the ground immediately adjacent the discharge end of the outlet neck, a deflector 28 may be attached to the underside of each outlet neck as by bolts 29. With this construction and arrangement the blower may be operated to blow to either side while the fan continues to rotate in the same direction.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous, new and useful results obtained thereby; the new and useful construction, and reasonable mechanical equivalents thereof obvious to those skilled in the art, are set forth in the appended claims.

I claim:

1. A portable blower including a rounded fan housing, oppositely disposed tangential outlet necks at one side of the fan housing, a fan rotatably mounted in the fan housing, means for rotating the fan in one direction only, and a damper pivotally mounted in the housing midway between the outlet necks and directly outward from the center of the fan, said damper being pivotally movable from a diagonal position in which one end of the damper contacts the top of one outlet neck and the other end contacts the bottom of the other outlet neck to the opposite diagonal position, for selectively cutting off communication of either outlet neck with the fan and discharging the entire air blast through the other outlet neck.

2. A portable blower as defined in claim 1 in which the damper is fixed upon a shaft, a spring lever is fixed to an end portion of the shaft and means is connected to the lever for oscillating the shaft.

3. A portable blower as defined in claim 1 in which a deflector is attached to the end of each outlet neck.

References Cited

UNITED STATES PATENTS

| 572,383 | 12/1896 | Smith | 230—47 |
|---|---|---|---|
| 960,815 | 6/1910 | Carlisle | 230—47 |
| 2,543,833 | 3/1951 | Clark | 230—47 XR |

FOREIGN PATENTS 315,321   4/1930   Great Britain.

ROBERT M. WALKER, Primary Examiner

U.S. Cl. X.R.

415—98